US012747919B2

(12) United States Patent
Inouye

(10) Patent No.: US 12,747,919 B2
(45) Date of Patent: Sep. 29, 2026

(54) TRACTOR RADIATOR CLEANING ARRANGEMENT

(71) Applicant: Michael Inouye, Decatur, TN (US)

(72) Inventor: Michael Inouye, Decatur, TN (US)

( * ) Notice: Subject to any disclaimer, the term of this patent is extended or adjusted under 35 U.S.C. 154(b) by 414 days.

(21) Appl. No.: 18/589,951

(22) Filed: Feb. 28, 2024

(65) Prior Publication Data

US 2025/0271225 A1 Aug. 28, 2025

(51) Int. Cl.

*B60S 3/00* (2006.01)
*F28G 1/16* (2006.01)
*F28G 15/04* (2006.01)

(52) U.S. Cl.

CPC .............. *F28G 1/166* (2013.01); *B60S 3/008* (2013.01); *F28G 15/04* (2013.01)

(58) Field of Classification Search

USPC .......................................................... 134/171
See application file for complete search history.

(56) References Cited

U.S. PATENT DOCUMENTS

D310,860 S 9/1990 Delepine
6,926,209 B2 8/2005 Cannon
6,974,487 B2 12/2005 Twiefel
7,418,997 B2 9/2008 Martin
11,007,465 B2 5/2021 Shriver
2008/0120802 A1 5/2008 Harvey
2013/0105603 A1 5/2013 Krankowsky

FOREIGN PATENT DOCUMENTS

EP 3650103 5/2020

*Primary Examiner* — Levon J Shahinian

(57) ABSTRACT

A tractor radiator cleaning arrangement is used for cleaning a radiator of a tractor or similar heavy machinery and includes a frame, a connecting arrangement, a manifold, conduits, and an inlet arrangement. The tractor radiator cleaning arrangement is placed behind and aligned with a radiator dispense fluid, such as air, water, or a combination thereof, out of conduits and toward the radiator to clean the radiator of materials clogging a radiator including debris, pollen, dirt, dust, and similar materials.

17 Claims, 5 Drawing Sheets

TRACTOR RADIATOR CLEANING ARRANGEMENT

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to cleaning of heavy machinery and more particularly pertains to a new tractor radiator cleaning arrangement for cleaning a radiator of a tractor or similar heavy machinery. Farmers, landscapers, and residential users can use a tractor in clearing, plowing, mowing, and other functions. The radiator often gets clogged with debris, pollen, dirt, and dust. The clogging material must be cleaned by brushing the clogging material off the front of the radiator and/or hosing it off with water regularly. This cleaning process is often inefficient in that it does not effect a very thorough cleaning or takes such time that it interferes with other tasks. It would therefore be advantageous to perform such a cleaning task quickly with a high degree of cleaning.

(2) Description of Related Art Including Information Disclosed Under 37 CFR 1.97 and 1.98

The prior art relates to cleaning of heavy machinery. The prior art, as best understood, does not disclose a tractor radiator cleaning arrangement for cleaning a radiator of a tractor or similar heavy machinery that includes a frame, a connecting arrangement, a manifold, conduits, and an inlet arrangement, and which is placed behind and aligned with a radiator dispense fluid, such as air, water, or a combination thereof, out of conduits and toward the radiator to clean the radiator of materials clogging a radiator including debris, pollen, dirt, dust, and similar materials.

(h) BRIEF SUMMARY OF THE INVENTION

An embodiment of the disclosure meets the needs presented above in a tractor radiator cleaning arrangement generally comprising a frame, a connecting arrangement, a manifold, conduits, and an inlet arrangement. The frame is rectangular and designed to be positioned behind and aligned with a radiator. The connecting arrangement is adjustable and designed to detachably connect the frame to a radiator. The manifold is mounted at a side of the frame. The conduits are mounted in the frame and positioned essentially parallel to one another. The conduits are connected to the manifold and positioned essentially perpendicular to the manifold. The inlet arrangement is connected to the manifold and designed to be connected to a supply of a fluid to permit flow thereof into the manifold and into the conduits. Each of the conduits includes nozzles that are designed to be positioned to dispense fluid out of the conduits and toward a radiator to clean a radiator of materials clogging a radiator including debris, pollen, dirt, dust, and similar materials. Such a design promotes very thorough cleaning without the need for the user to brush or otherwise manually clean the radiator, thereby saving time and promoting a very thorough cleaning.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
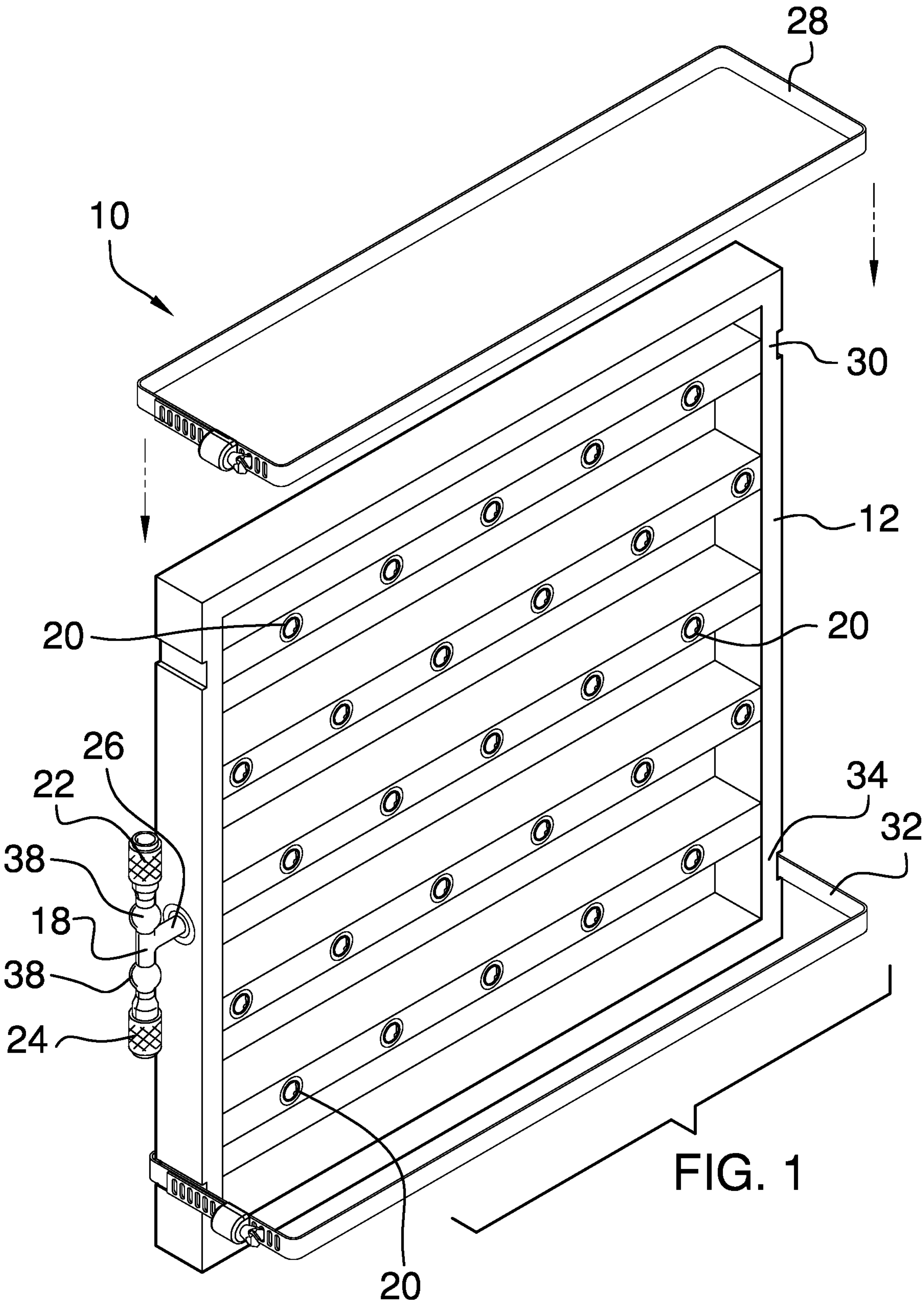
FIG. 1 is a perspective view of a tractor radiator cleaning arrangement according to an embodiment of the disclosure.
Figure 2:
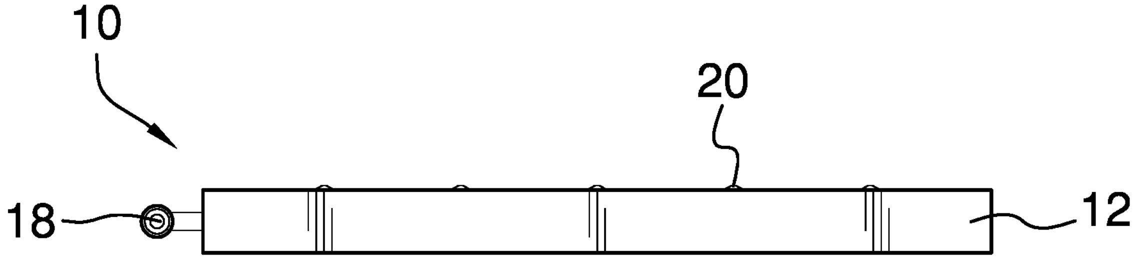
FIG. 2 is a top view of an embodiment of the disclosure.
Figure 3:
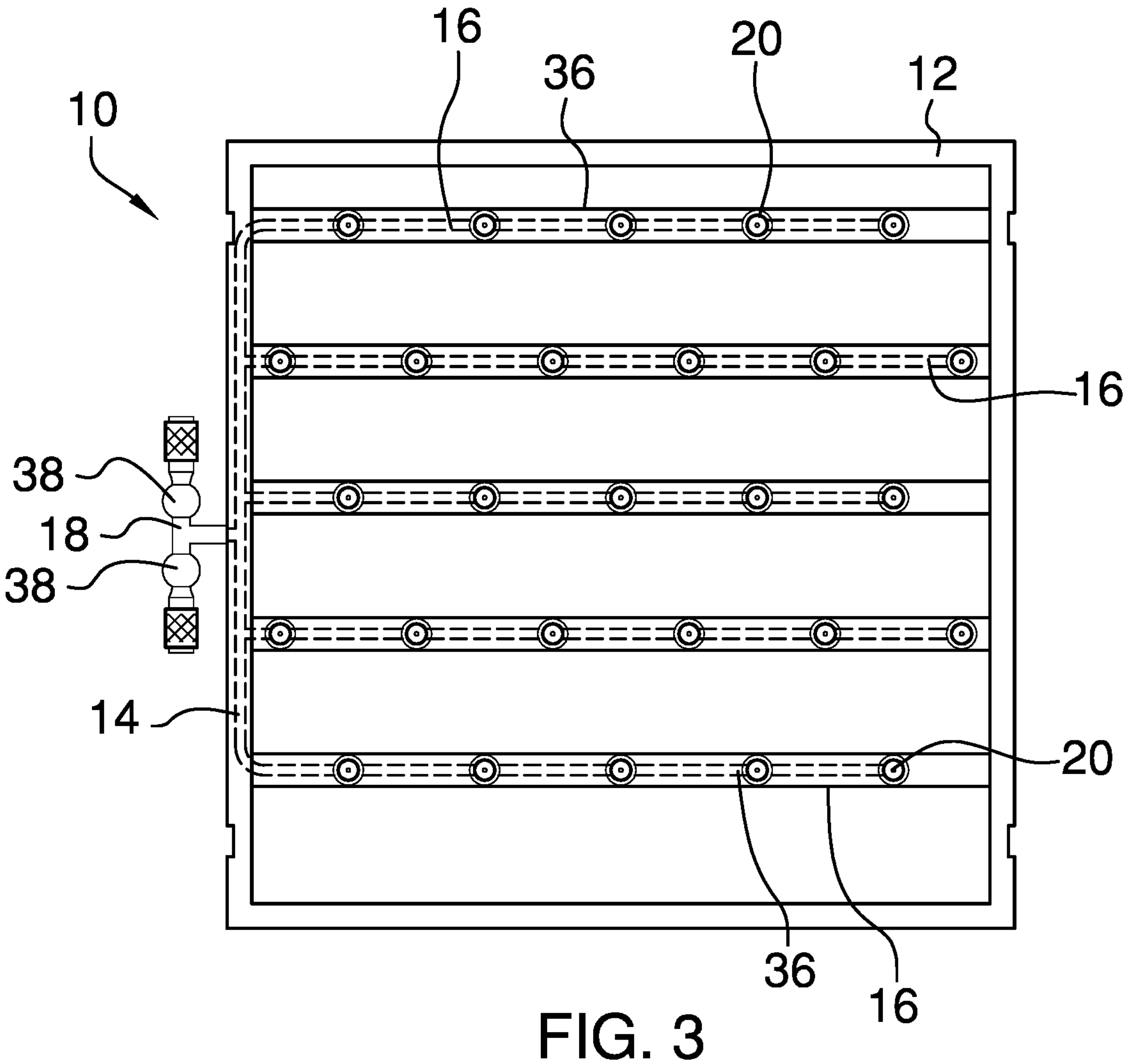
FIG. 3 is a front view of an embodiment of the disclosure.
Figure 4:
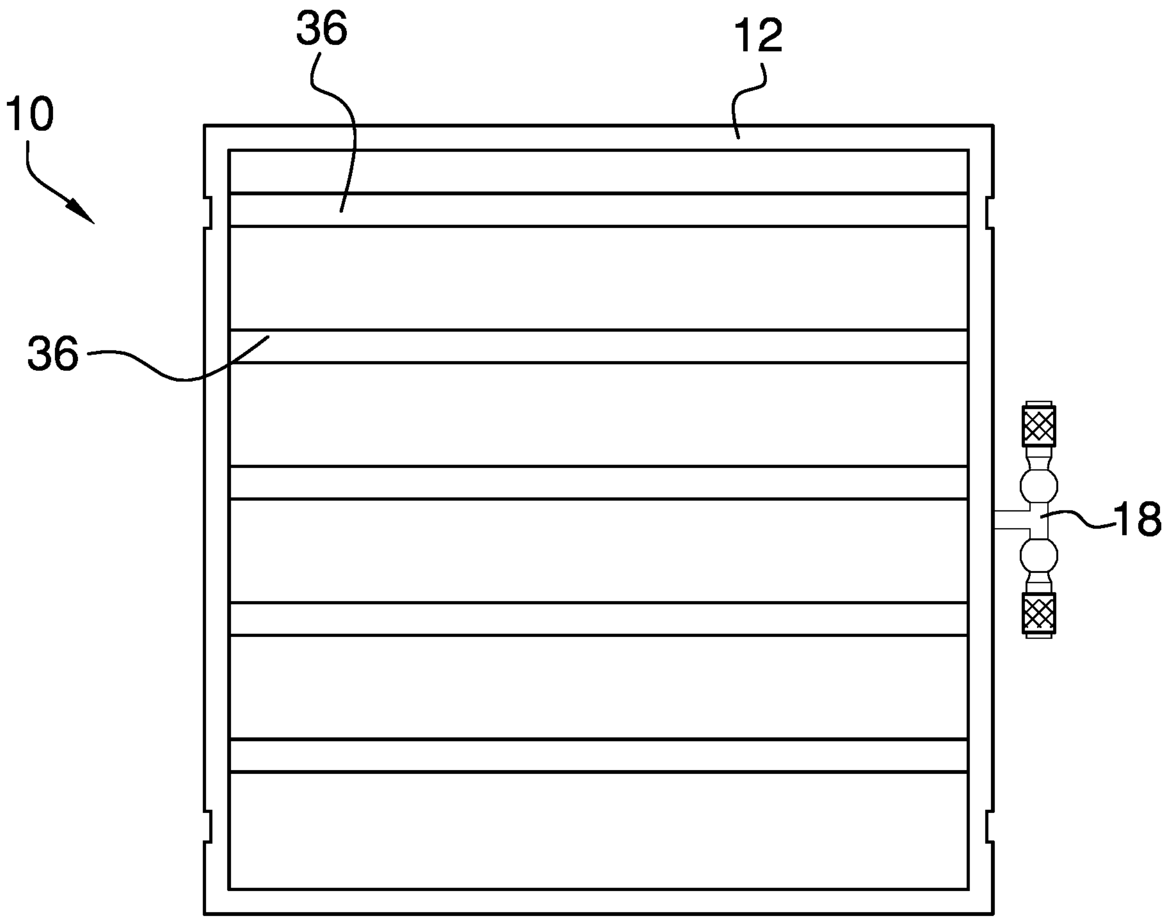
FIG. 4 is a rear view of an embodiment of the disclosure.
Figure 5:
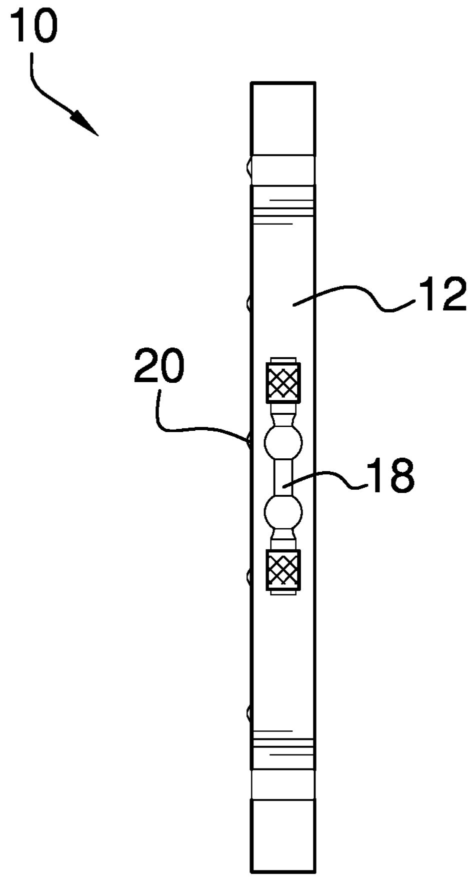
FIG. 5 is a side view of an embodiment of the disclosure.

With reference now to the drawings, and in particular to FIGS. 1 through 6 thereof, a new tractor radiator cleaning arrangement embodying the principles and concepts of an embodiment of the disclosure and generally designated by the reference numeral 10 will be described.

As best illustrated in FIGS. 1 through 6, the tractor radiator cleaning arrangement 10 for cleaning a radiator 60 of a tractor 62 or similar heavy machinery includes a frame 12, a connecting arrangement, a manifold 14, conduits 16, and an inlet arrangement 18. The frame 12 is rectangular and designed to be positioned behind and aligned with a radiator 60. The connecting arrangement is adjustable and designed to detachably connect the frame 12 to a radiator 60. The manifold 14 is mounted at a side of the frame 12. The conduits 16 are mounted in the frame 12 and positioned essentially parallel to one another. In the embodiment shown in FIG. 3, the manifold 14 is essentially vertical and the conduits 16 are essentially horizontal, though those positions could be reversed. The conduits 16 are connected to the manifold 14 and positioned essentially perpendicular to the manifold 14. The inlet arrangement 18 is connected to the manifold 14 and designed to be connected to a supply of a fluid to permit flow thereof into the manifold 14 and into the conduits 16. Each of the conduits 16 includes nozzles 20 that are designed to be positioned to dispense fluid out of the conduits 16 and toward a radiator 60 to clean a radiator 60 of materials clogging a radiator 60 including debris, pollen, dirt, dust, and similar materials.

Figure 6:
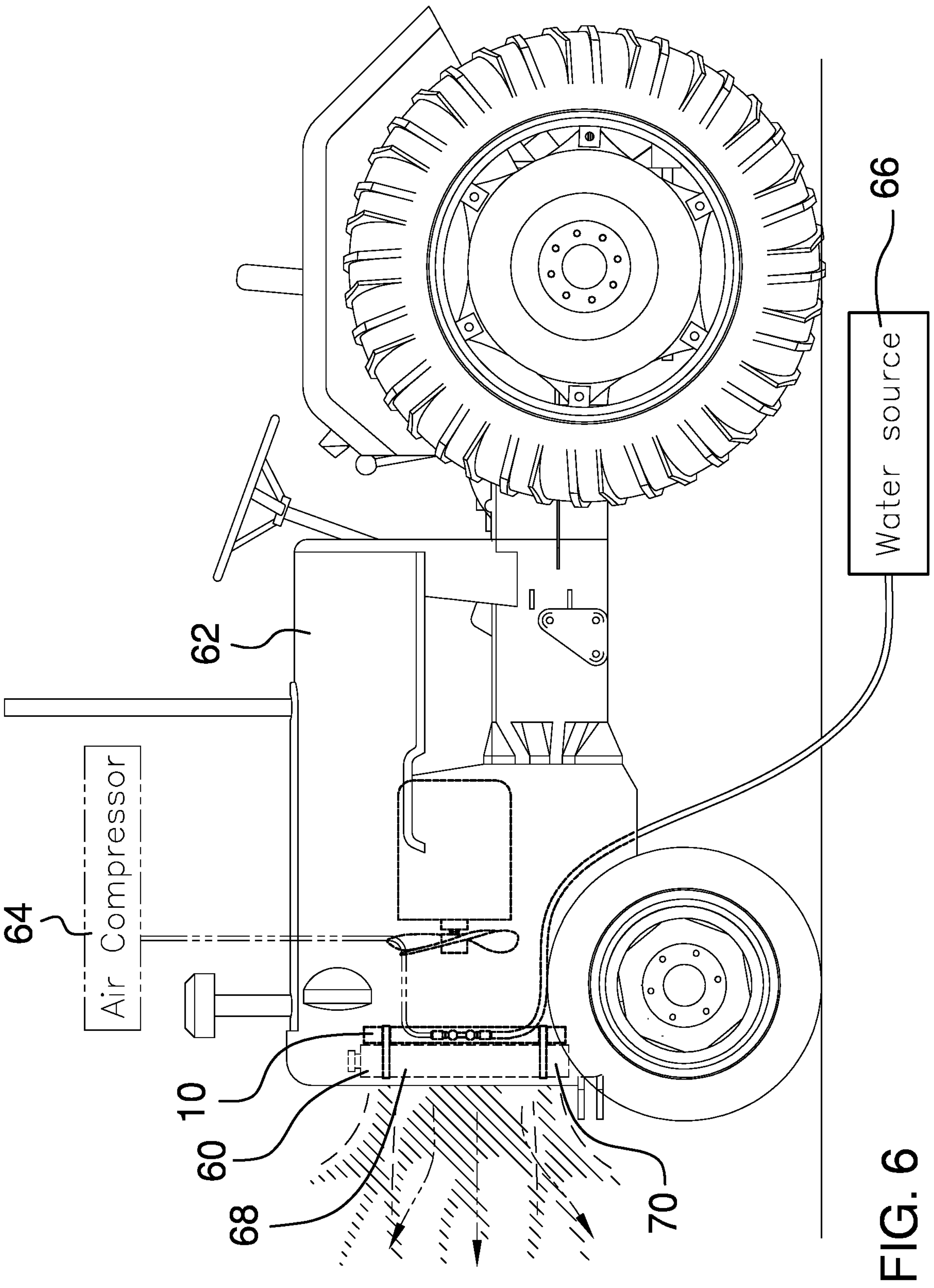
FIG. 6 is a side view of an embodiment of the disclosure in use.

In accordance with at least one possible embodiment, such as shown in FIG. 6, the frame 12 has a height and width essentially similar to the radiator 60. This size may be adjusted during manufacture to fit a larger or smaller radiator 60. As shown in FIG. 1, the nozzles 20 are spaced essentially evenly across the height and width of the frame 12 to permit dispensing of fluid into all or substantially all of the fins of a radiator 60 to promote thorough cleaning of a radiator 60.

In accordance with at least one possible embodiment, the inlet arrangement 18 includes a first connecting structure 22, a second connecting structure 24, and a central conduit 26. The first connecting structure 22 is designed to connect to a compressed air supply 64 to permit flow of pressurized air into the manifold 14 and the conduits 16 and out the nozzles 20. The second connecting structure 24 is designed to connect to a water supply 66 to permit flow of water into the manifold 14 and the conduits 16 and out the nozzles 20. The central conduit 26 is designed and positioned to connect each of the first connecting structure 22 and the second connecting structure 24 to the manifold 14 to permit flow of air or water or a combination of air and water. Any type of suitable connecting structure could be used, such as a quick connect for compressed air or a female water hose adapter. Quarter-turn globe valves 38 could also be included to control the flow of air and water.

In accordance with at least one possible embodiment, the connecting arrangement includes an upper metal band 28 and a lower metal band 32. The upper metal band 28 is expandable to permit placement around an upper frame portion 30 and an upper radiator portion 68 and contractable to permit tightening to detachably secure the upper frame portion 30 to the upper radiator portion 68. The lower metal band 32 is expandable to permit placement around a lower frame portion 34 and a lower radiator portion 70 and contractable to permit tightening to detachably secure the lower frame portion 34 to a lower radiator portion 70.

In accordance with at least one possible embodiment, the frame 12 includes slats 36 that are designed to house the conduits 16.

In order to user the tractor radiator cleaning arrangement 10 to clean a radiator 60 of a tractor 62 or similar heavy machinery, the user first positions the frame 12 behind and aligned with the radiator 60 such that the nozzles 20 are positioned to dispense fluid toward the radiator 60. The user then detachably connects the frame 12 to the radiator 60 with the connecting arrangement. The user then connects a supply of fluid to the inlet arrangement 18. The user then activates the supply of fluid and conducts the fluid into the inlet arrangement 18 and then into the manifold 14 and then into the conduits 16 and then ultimately out through the nozzles 20. The expelled fluid cleans the radiator 60 of materials clogging the radiator 60 including debris, pollen, dirt, dust, and similar materials by removing and expelling the materials out through the front end of the radiator 60. Once the radiator 60 is sufficiently cleaned, the user deactivates the supply of fluid. Since the frame 12 can be designed to have a height and width essentially similar to the radiator 60, and since the nozzles 20 are spaced essentially evenly across the height and width of the frame 12, fluid is dispensed into all or substantially all of the fins of the radiator 60, which results in a thorough cleaning of the radiator 60. Due to the T-shaped design of the inlet arrangement 18, a user can use air or water or a combination of air and water. The inlet arrangement 18 can be designed in a known manner to control the flow of fluid therethrough, such as by including stop valves or a three-way valve. In accordance with at least one possible embodiment, the user can manually open at least one valve 38 in the inlet arrangement 18 to permit flow of fluid therethrough, and can manually close the at least one valve 38 to stop flow of fluid therethrough. The user can therefore control the cleaning process either at the fluid source or at the inlet arrangement 18.

As shown in FIG. 1 and as installed in FIG. 6, the user expands the upper metal band 28 and places the upper metal band 28 around the upper frame portion 30 and the upper radiator portion 68 and then contracts and tightens the upper metal band 28 onto the upper frame portion 30 and the upper radiator portion 68. The user also expands the lower metal band 32 and places the lower metal band 32 around the lower frame portion 34 and the lower radiator portion 70 and then contracts and tightens the lower metal band 32 onto the lower frame portion 34 and the lower radiator portion 70. The expandable design allows the tractor radiator cleaning arrangement 10 to be installed and removed easily onto radiators 60 of different sizes and shapes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tractor radiator cleaning arrangement for cleaning a radiator of a tractor or similar heavy machinery comprising:

a frame being rectangular and configured to be disposed behind and aligned with a radiator;

a connecting arrangement being adjustable and configured to detachably connect said frame to a radiator;

a manifold being mounted at a side of said frame;

conduits being mounted in said frame and disposed essentially parallel to one another;

said conduits being connected to said manifold and disposed essentially perpendicular to said manifold;

an inlet arrangement being connected to said manifold and configured to be connected to a supply of a fluid to permit flow thereof into said manifold and into said conduits; and each of said conduits comprising nozzles being configured to be disposed to dispense fluid out of said conduits and toward a radiator to clean a radiator of materials clogging a radiator including debris, pollen, dirt, dust, and similar materials.

2. The tractor radiator cleaning arrangement of claim 1, wherein:

said frame has a height and width essentially similar to said radiator; and said nozzles are spaced essentially evenly across the height and width of said frame to permit dispensing of fluid into all or substantially all of the fins of a radiator to promote thorough cleaning of a radiator.

3. The tractor radiator cleaning arrangement of claim 2, wherein said inlet arrangement comprises:

a first connecting structure configured to connect to a compressed air supply to permit flow of pressurized air into said manifold and said conduits and out said nozzles;

a second connecting structure configured to connect to a water supply to permit flow of water into said manifold and said conduits and out said nozzles; and a central conduit configured and disposed to connect each of said first connecting structure and said second connecting structure to said manifold to permit flow of air or water or a combination of air and water.

4. The tractor radiator cleaning arrangement of claim 3, wherein said connecting arrangement comprises:

an upper metal band being expandable to permit placement around an upper frame portion and an upper radiator portion and contractable to permit tightening to detachably secure said upper frame portion to an upper radiator portion; and a lower metal band being expandable to permit placement around a lower frame portion and a lower radiator portion and contractable to permit tightening to detachably secure said lower frame portion to a lower radiator portion.

5. The tractor radiator cleaning arrangement of claim 4, wherein said frame comprises slats configured to house said conduits.

6. The tractor radiator cleaning arrangement of claim 5, wherein said first connecting structure comprises a valve and a quick connect for compressed air and said second connecting structure comprises a valve and a female water hose adapter.

7. The tractor radiator cleaning arrangement of claim 1, wherein said inlet arrangement comprises:

a first connecting structure configured to connect to a compressed air supply to permit flow of pressurized air into said manifold and said conduits and out said nozzles;

a second connecting structure configured to connect to a water supply to permit flow of water into said manifold and said conduits and out said nozzles; and a central conduit configured and disposed to connect each of said first connecting structure and said second connecting structure to said manifold to permit flow of air or water or a combination of air and water.

8. The tractor radiator cleaning arrangement of claim 7, wherein said first connecting structure comprises a valve and a quick connect for compressed air and said second connecting structure comprises a valve and a female water hose adapter.

9. The tractor radiator cleaning arrangement of claim 1, wherein said connecting arrangement comprises:

an upper metal band being expandable to permit placement around an upper frame portion and an upper radiator portion and contractable to permit tightening to detachably secure said upper frame portion to an upper radiator portion; and a lower metal band being expandable to permit placement around a lower frame portion and a lower radiator portion and contractable to permit tightening to detachably secure said lower frame portion to a lower radiator portion.

10. The tractor radiator cleaning arrangement of claim 1, wherein said frame comprises slats configured to house said conduits.

11. A method of cleaning a radiator of a tractor or similar heavy machinery using the tractor radiator cleaning arrangement of claim 1, said method comprising the steps of:

disposing said frame behind and aligned with said radiator such that said nozzles are disposed to dispense fluid toward a radiator;

detachably connecting said frame to said radiator with said connecting arrangement;

connecting a supply of fluid to said inlet arrangement;

activating said supply of fluid and conducting said fluid into said inlet arrangement and then into said manifold and then into said conduits and then out through said nozzles such that said fluid cleans said radiator of materials clogging said radiator including debris, pollen, dirt, dust, and similar materials by removing and expelling said materials out through the front end of said radiator; and deactivating said supply of fluid upon said radiator being sufficiently cleaned.

12. The method of claim 11, wherein said frame has a height and width essentially similar to said radiator and said nozzles are spaced essentially evenly across the height and width of said frame, and wherein said method further comprises dispensing fluid into all or substantially all of the fins of said radiator and thereby thoroughly cleaning said radiator.

13. The method of claim 12, wherein said fluid comprises air or water or a combination of air and water.

14. The method of claim 13, wherein said connecting arrangement comprises an upper metal band and a lower metal band, and said step of detachably connecting said frame to said radiator comprises:

expanding said upper metal band and placing said upper metal band around an upper frame portion and an upper radiator portion and then contracting and tightening said upper metal band onto said upper frame portion and said upper radiator portion; and expanding said lower metal band and placing said lower metal band around a lower frame portion and a lower radiator portion and then contracting and tightening said lower metal band onto said lower frame portion and said lower radiator portion.

15. The method of claim 11, wherein said fluid comprises air or water or a combination of air and water.

16. The method of claim 11, wherein said connecting arrangement comprises an upper metal band and a lower metal band, and said step of detachably connecting said frame to said radiator comprises:

expanding said upper metal band and placing said upper metal band around an upper frame portion and an upper radiator portion and then contracting and tightening said upper metal band onto said upper frame portion and said upper radiator portion; and expanding said lower metal band and placing said lower metal band around a lower frame portion and a lower radiator portion and then contracting and tightening said lower metal band onto said lower frame portion and said lower radiator portion.

17. The method of claim 11, wherein said method further comprises manually opening at least one valve in inlet arrangement to permit flow of fluid therethrough, and manually closing said at least one valve to stop flow of fluid therethrough.

* * * * *